(12) United States Patent
Naik et al.

(10) Patent No.: US 9,338,012 B1
(45) Date of Patent: May 10, 2016

(54) SYSTEMS AND METHODS FOR IDENTIFYING CODE SIGNING CERTIFICATE MISUSE

(71) Applicant: Symantec Corporation, Mountain View, CA (US)

(72) Inventors: Alok Naik, Bangalore (IN); Suhas Prakashkumar, Bangalore (IN); Sreekanth Narayanan, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 256 days.

(21) Appl. No.: 14/046,418

(22) Filed: Oct. 4, 2013

(51) Int. Cl.
*H04L 9/00* (2006.01)
*H04L 9/32* (2006.01)

(52) U.S. Cl.
CPC .................................. *H04L 9/3247* (2013.01)

(58) Field of Classification Search
CPC .............................. H04L 63/10; H04L 9/3247
USPC ........... 726/1, 2, 3, 4, 5, 6; 713/176, 179, 164
See application file for complete search history.

(56) References Cited

U.S. PATENT DOCUMENTS

2012/0096516 A1* 4/2012 Sobel .................... G06F 21/645
726/2
2013/0097660 A1* 4/2013 Das ......................... H04L 63/10
726/1

OTHER PUBLICATIONS

Adams, C. et al., "Internet X.509 Public Key Infrastructure Time-Stamp Protocol (TSP)", https://www.ietf.org/rfc/rfc3161.txt, as accessed Aug. 5, 2013, Request for Comments: 3161, (Aug. 2001).
"Detecting Compromised SSL Certificates Using Nessus", http://www.tenable.com/blog/detecting-compromised-ssl-certificates-using-nessus, as accessed Aug. 5, 2013, Tenable Network Security, (Feb. 9, 2013).

* cited by examiner

*Primary Examiner* — Brandon Hoffman
*Assistant Examiner* — Nega Woldemariam
(74) *Attorney, Agent, or Firm* — ALG Intellectual Property, LLC (57) ABSTRACT

A computer-implemented method for identifying code signing certificate misuse may include (1) identifying a software file that has been signed using a code signing certificate, (2) identifying a software publisher that is identified by the code signing certificate used to sign the software file, (3) obtaining a reputation score for the software file that indicates a trustworthiness of the software file independently of the code signing certificate, and (4) providing, to the software publisher, information that is based on the reputation score and that indicates that the code signing certificate has been compromised. Various other methods, systems, and computer-readable media are also disclosed.

20 Claims, 7 Drawing Sheets

SYSTEMS AND METHODS FOR IDENTIFYING CODE SIGNING CERTIFICATE MISUSE

BACKGROUND

Public key encryption has proven to be a versatile tool for verifying the authenticity and accuracy of digital data. One application of public key encryption is code signing, which enables a software user to verify (1) that a software file originated from the software publisher that is identified in a code signing certificate embedded in the software file, and (2) that the file has not been modified since it was digitally signed by the software publisher. The security of code signing depends a trusted certificate authority verifying the identity of the software publisher, the software publisher protecting the secrecy of a private key used in the encryption algorithm used to create digital signatures, and the security of code signing certificates used to create signed software files.

Unfortunately, malware developers may target software publishers to steal code signing certificates. These malware developers may then use the stolen certificates to create malware purporting to have originated from the targeted software publishers. Alternatively, malware developers may use duplicated code signing certificates to digitally sign malware. In some cases, malware developers may obtain code signing certificates in the name of a software publisher. These vulnerabilities demonstrate a potential point of weakness of code signing—that the user may not have a way to verify that the software publisher authorized a particular software file to be signed using the accompanying code signing certificate.

In view of the above, the instant disclosure generally relates to systems and methods for identifying code signing certificate misuse by combining code signing certificate security for a software file with reputation data for the software file.

SUMMARY

As will be described in greater detail below, the instant disclosure generally relates to systems and methods for identifying code signing certificate misuse by obtaining a reputation score that may indicate the trustworthiness of the code signing certificate independently of the code signing certificate and then notifying the software publisher that the code signing certificate may have been compromised.

In one example, a computer-implemented method for identifying code signing certificate misuse may include (1) identifying a software file that has been signed using a code signing certificate, (2) identifying a software publisher that is identified by the code signing certificate used to sign the software file, (3) obtaining a reputation score for the software file that indicates a trustworthiness of the software file independently of the code signing certificate, and (4) providing, to the software publisher, information that is based on the reputation score and that indicates that the code signing certificate has been compromised.

In one embodiment, the reputation score may be based on (1) a prevalence of the software file and/or (2) at least one detected association of the software file with malware. In one embodiment, the computer-implemented method may further include (1) identifying a plurality of software files that were signed using a code signing certificate, (2) obtaining, for each software file in the plurality of software files, a reputation score that indicates a likelihood that the software publisher did not authorize the software file to be signed using the code signing certificate, and (3) providing, to the software publisher, a list of software files in the plurality of software files, prioritized by reputation score.

In some examples, the computer-implemented method may further include receiving, from the publisher of the plurality of software files, an indication that the publisher of the software file did not authorize the software file to be signed by the code signing certificate. In other examples, the computer-implemented method may further include performing a security action in response to receiving an indication that the publisher of the plurality of software files did not authorize the software file to be signed by the code signing certificate.

In one embodiment, the computer-implemented method may further include (1) receiving, from the software publisher, for each software file in a plurality of software files authorized to be signed using the code signing certificate, identification of the software file, and (2) compiling a certificate database associating the code signing certificate with identification of each software file in the plurality of software files authorized to be signed using the code signing certificate.

In some embodiments, the computer-implemented method may further include (1) obtaining a second software file signed using a second code signing certificate, (2) extracting from the second software file the second code signing certificate used to sign the software file, and (3) adding to the certificate database an entry associating the extracted second code signing certificate with identification of the second software file. In other embodiments, identification of each software file in the plurality of software file may include (1) the software file and/or (2) a digital signature from the software file.

In some examples, the computer-implemented method may further include verifying that a software file was signed by an authorized certificate by (1) receiving a software file signed using a code signing certificate; (2) verifying the integrity of the software file by (a) obtaining a public key of the key pair used to encrypt the software file digest included in the digital signature of the software file, (b) decrypting the software file digest included in the digital signature of the software file, (c) creating a second software file digest using the hash algorithm specified in the digital signature of the software file, and (d) verifying that the software file digest and the second software file digest are identical; (3) querying, using identification of the software file, the certificate database; and (4) receiving, in response to querying the certificate database, indication of whether the software publisher authorized the file to be signed using the code signing certificate.

In one embodiment, a system for implementing the above-described method may include (1) an identification module that identifies a software file that has been signed using a code signing certificate, (2) a publisher identification module that identifies a software publisher that is identified by the code signing certificate used to sign the software file, (3) an obtaining module that obtains a reputation score for the software file that indicates a trustworthiness of the software file independently of the code signing certificate, (4) a providing module that provides, to the software publisher, information that is based on the reputation score and that indicates that the code signing certificate has been compromised, and (5) at least one processor configured to execute the identification module, the obtaining module, and the providing module.

In some examples, the above-described method may be encoded as computer-readable instructions on a non-transitory computer-readable-storage medium. For example, a computer-readable-storage medium may include one or more computer-executable instructions that, when executed by at least one processor of a computing device, may cause the computing device to (1) identify a software file that has been signed using a code signing certificate, (2) identify a software publisher that is identified by the code signing certificate used to sign the software file, (3) obtain a reputation score for the software file that indicates a trustworthiness of the software file independently of the code signing certificate, and (4) provide, to the software publisher, information that is based on the reputation score and that indicates that the code signing certificate has been compromised.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying code signing certificate misuse. As will be explained in greater detail below, the systems and methods described herein may leverage digital signatures as well as reputation information to identify potential code signing certificate misuse. Embodiments of the instant disclosure may proactively alert software publishers of possible code signing certificate compromises. Embodiments of the instant disclosure may identify which of a group of software files are most likely to have been signed by a compromised code signing certificate. Other embodiments of the instant disclosure may also compile a database associating code signing certificates with software files that were authorized to be signed using the certificates. Some embodiments may verify that a provided software file was authorized to be signed using the associated code signing certificate. The systems and methods described herein may also provide various other features and advantages.

The following will provide, with reference to FIGS. 1-2 and 4-5, detailed descriptions of exemplary systems for identifying code signing certificate misuse. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
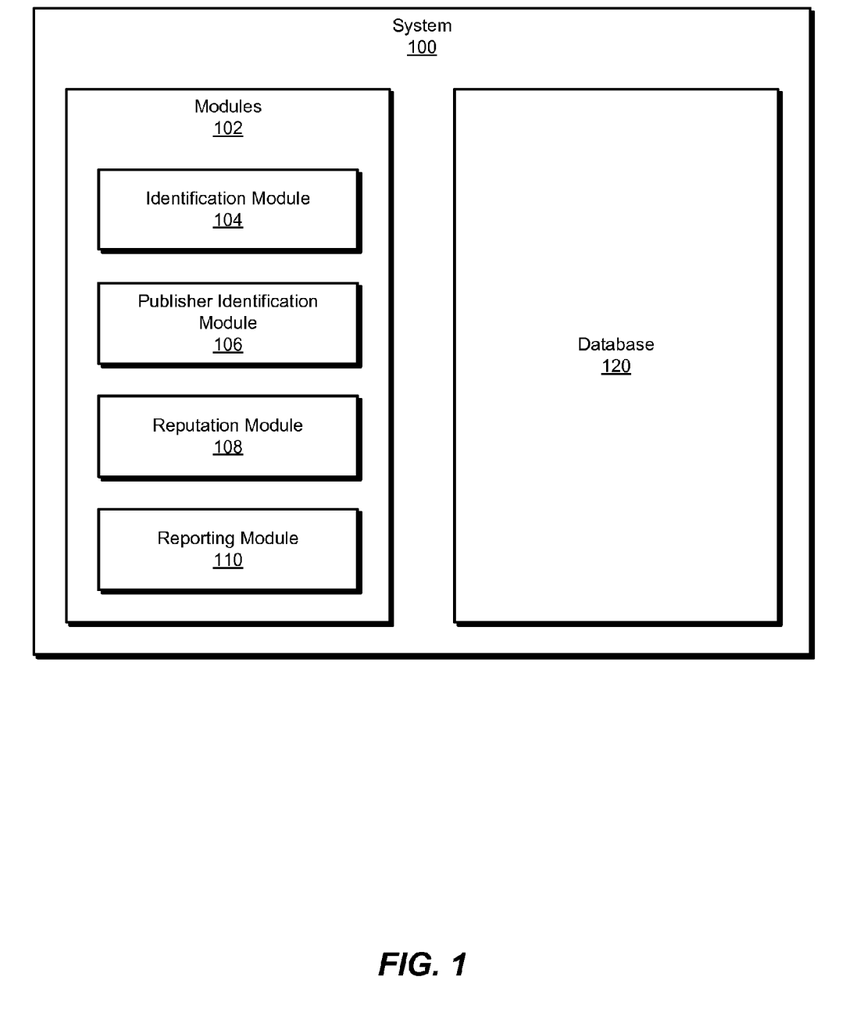
FIG. 1 is a block diagram of an exemplary system for identifying code signing certificate misuse.

FIG. 1 is a block diagram of an exemplary system 100 for identifying code signing certificate misuse. As illustrated in this figure, exemplary system 100 may include one or more modules 102 for performing one or more tasks. For example, and as will be explained in greater detail below, exemplary system 100 may include an identification module 104 that identifies a software file that has been signed using a code signing certificate. Exemplary system 100 may also include a publisher identification module 106 that identifies a software publisher that is identified by the code signing certificate used to sign the software file.

In addition, and as will be described in greater detail below, exemplary system 100 may include a reputation module 108 that that obtains a reputation score for the software file that indicates a trustworthiness of the software file independently of the code signing certificate. Exemplary system 100 may include a reporting module 110 that provides, to the software publisher, information that is based on the reputation score and that indicates that the code signing certificate has been compromised. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store reputation scores for software files.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
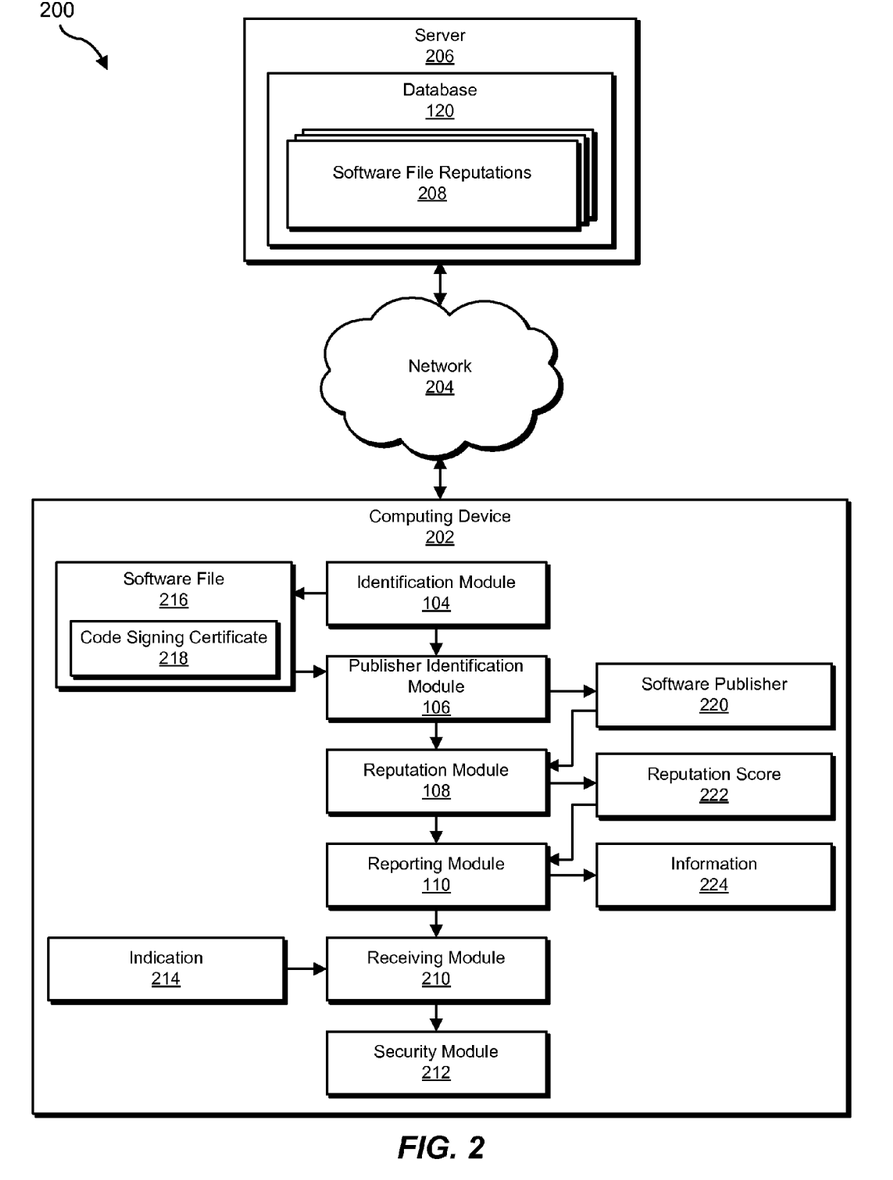
FIG. 2 is a block diagram of an additional exemplary system for identifying code signing certificate misuse.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to identify misuse of a code signing certificate. For example, and as will be described in greater detail below, one or more of modules 102 may cause computing device 202 and/or server 206 to identify a software file 216 that has been signed using code signing certificate 218. Publisher identification module 106 may be programmed to identify a software publisher 220 that is identified by code signing certificate 218 used to sign software file 216. Reputation module 108 may be programmed to obtain a reputation score 222 for software file 216 (e.g., from software file reputations 208) that indicates a trustworthiness of the software file 216 independently of code signing certificate 218. Reporting module 110 may be programmed to provide, to software publisher 220, information 224 that is based on reputation score 222 and that indicates that code signing certificate 218 has been compromised.

Some embodiments of exemplary system 200 may include a receiving module 210 that may be programmed to receive, from software publisher 220, an indication that the publisher of the software file did not authorize software file 216 to be signed by the code signing certificate 218. Exemplary system 200 may also include a security module 212 that may be programmed to perform a security action in response to receiving an indication that software publisher 220 did not authorize software file 216 to be signed by code signing certificate 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
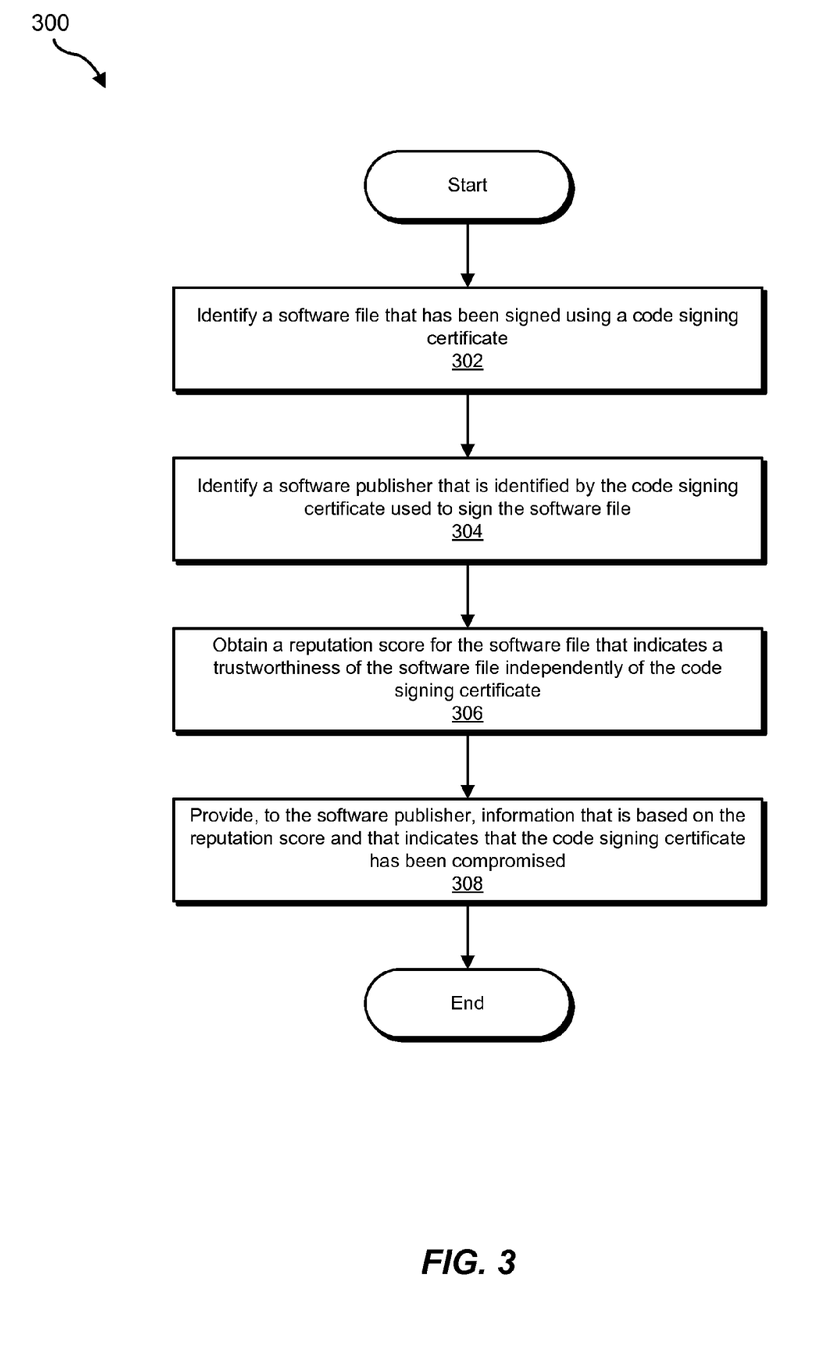
FIG. 3 is a flow diagram of an exemplary method for identifying code signing certificate misuse.

FIG. 3 is a flow diagram of an exemplary computer-implemented method 300 for identifying code signing certificate misuse. The steps shown in FIG. 3 may be performed by any suitable computer-executable code and/or computing system.

Figure 6:
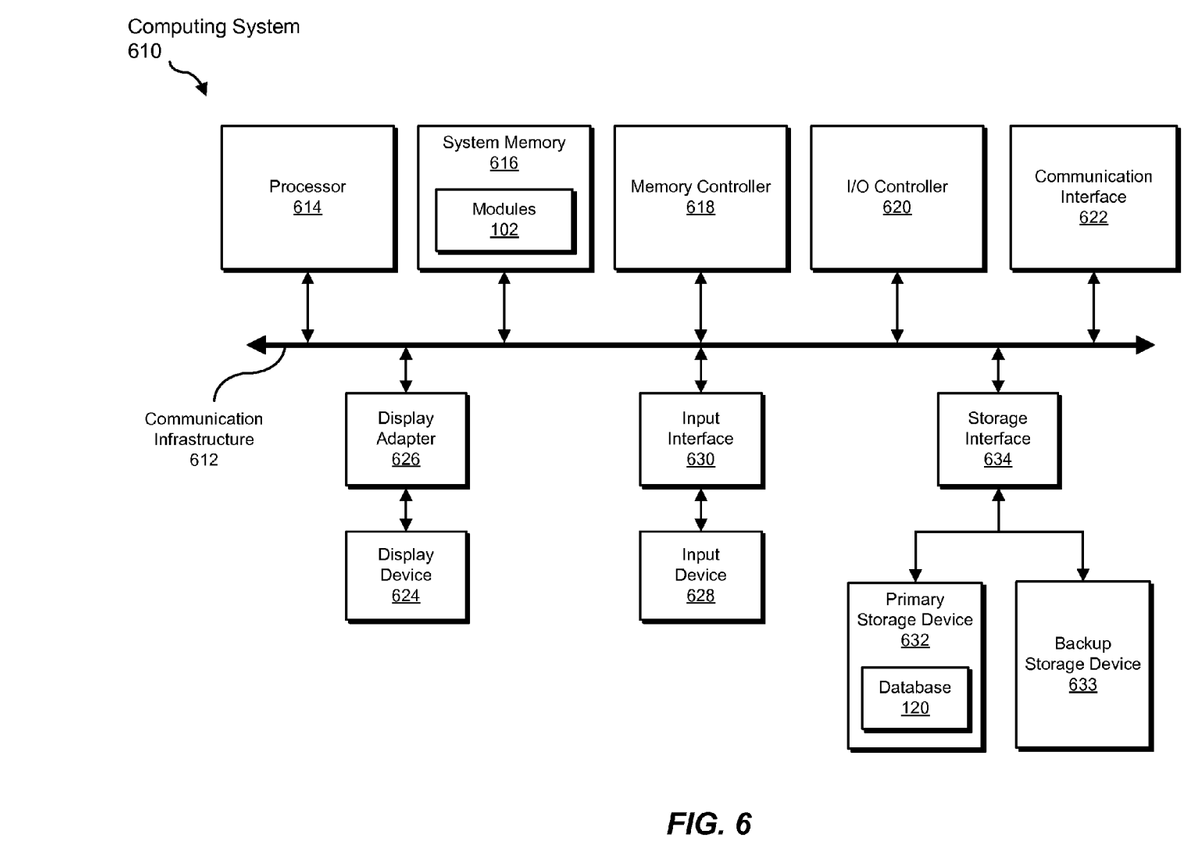
FIG. 6 is a block diagram of an exemplary computing system capable of implementing one or more of the embodiments described and/or illustrated herein.
Figure 7:
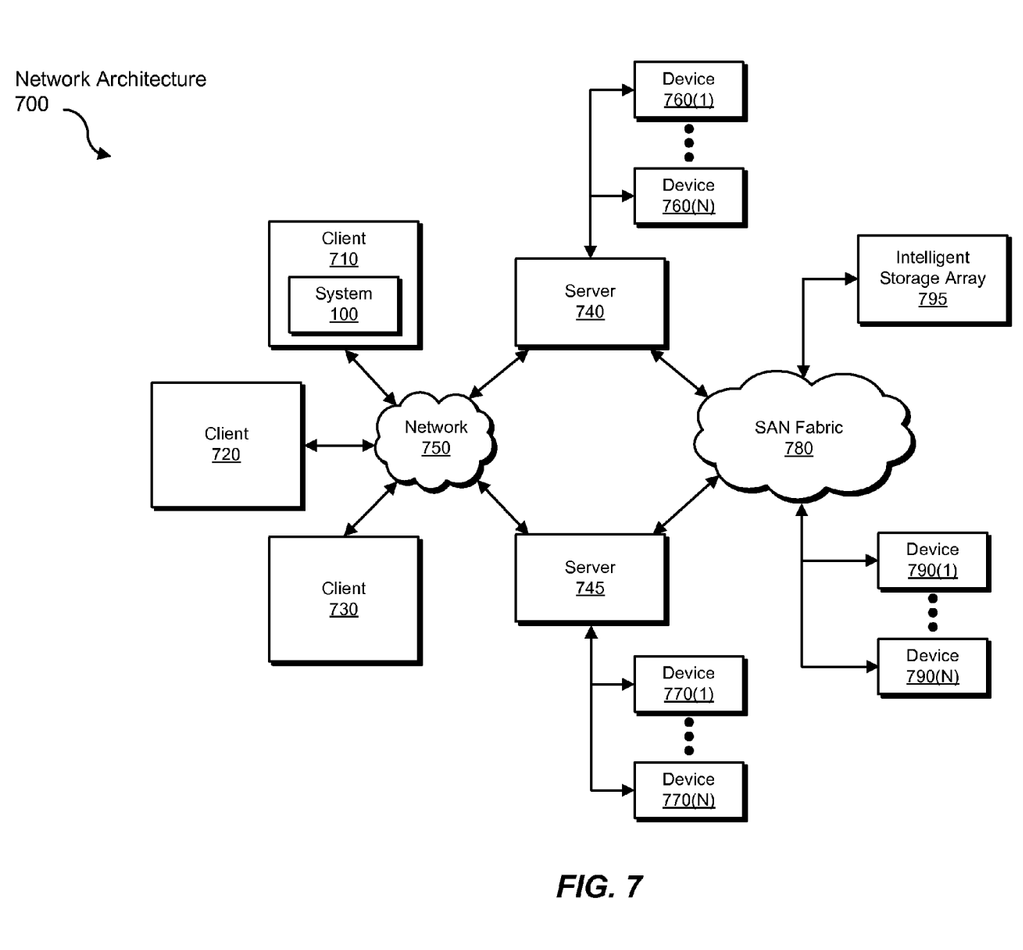
FIG. 7 is a block diagram of an exemplary computing network capable of implementing one or more of the embodiments described and/or illustrated herein.

In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a software file that has been signed using a code signing certificate. For example, at step 302, identification module 104 may, as part of computing device 202 in FIG. 2, identify software file 216 that has been signed using code signing certificate 218.

The phrase "software file," as used herein, generally refers to any type or form of executable code (e.g., a sequence of computer-readable instructions). Software files may include, without limitation, system software, application software, utility programs, productivity programs, entertainment programs, device drivers, configuration files, macros, scripts, bytecode files, software libraries, software updates, and/or any other type of computer application.

As used herein, the phrase "code signing certificate" generally refers to any electronic document that is embedded in a software file and is used (e.g., with public key cryptography) to create a digital signature that binds a public key to the identity of a software publisher. Code signing certificates may be issued by a certificate authority that verifies the identity of the software publisher. Software publishers may also their own code signing certificates. Certificates may expire after a period of time specified when the certificate is created (e.g., after one or two years). The publisher may submit a public key to the certificate authority and retain a private key to be used in encryption. Software users may then obtain the public key, either from the publisher or the certificate authority, to verify that a code signing certificate originated from the software publisher. In some examples, certificate authorities may issue digital certificates for purposes other than code signing—a code signing certificate, however, may contain fields indicating that the certificate is to be used only in code signing.

The phrase "digital signature," as used herein, generally refers to digital code embedded in a software file to assist users in verifying the identity of the software publisher of the software file and/or the integrity of the software file. To create a digital signature, a software publisher may use a hash function to create a digest of a software file, which may then be encrypted using the software publisher's private key from the encryption key pair. The software publisher may then create the digital signature by combining the encrypted digest with the code signing certificate and the hash algorithm used to create the digest.

The systems described herein may identify a software file that has been signed using a code signing certificate in any suitable manner. For example, identification module 104 may identify one or more software files received directly from a software publisher and/or from a website controlled by the software publisher. Additionally or alternatively, identification module 104 may identify the software file when the software file is purchased and/or acquired through a third-party application distribution source (e.g., an application store). In some examples, identification module 104 may identify the software file during a scan of a computing system (e.g., a security scan). Additionally or alternatively, identification module 104 may identify the software file by identifying a request to execute the software file.

Returning to FIG. 3, at step 304 one or more of the systems described herein may identify a software publisher that is identified by the code signing certificate used to sign the software file. For example, at step 304 publisher identification module 106 may, as part of computing device 202 in FIG. 2, identify software publisher 220 that is identified by the code signing certificate 218 used to sign software file 216.

The phrase "software publisher," as used herein, generally refers to an individual or organization that disseminates software files to be used by others. The role of a software publisher may include preparing distribution media, translating and/or printing documentation, packaging, marketing, advertising, and promotion of the software. A software publisher may be the developer of the software or may have purchased or licensed the right to publish the software. A software publisher may also be the distributor of the software, or may use one or more other parties as distributors between the publisher and end users. In some examples, a software publisher may control the content of software and/or associate its reputation with software that it publishes.

The systems and described herein may identify the software publisher in any of a variety of ways. For example, publisher identification module 106 may identify the software publisher as the individual or company from which identification module 104 received the software file. Publisher identification module 106 may also receive identification of the software publisher from a reputable distributor or retailer that delivers the software file. In some examples, publisher identification module 106 may verify the identity of the software publisher by comparing the software publisher name with the entity named in a subject name field of the digital signature.

At step 306 one or more of the systems described herein may obtain a reputation score for the software file that indicates a trustworthiness of the software file independently of the code signing certificate. For example, at step 306 reputation module 108 may, as part of computing device 202 in FIG. 2, query database 120 hosted by server 206 to obtain reputation score 222 for software file 216 that indicates a trustworthiness of software file 216 independently of code signing certificate 218.

The phrase "reputation score," as used herein, generally refers to one or more metrics indicative of a trustworthiness, prevalence, prominence, community opinion, and/or reputation of a software file. A reputation score may be based on a variety of factors, such as, the length of time the software file has been in use on one or more devices, an indication of the reliability of the publisher or developer of the software file, a number of detected incidents that the software file may have been associated with malware, a community rating of the software file, an evaluation of the software file by a trusted entity, and/or any other suitable factor. In some embodiments, two or more factors of a reputation score may be weighted and combined to yield a single numerical value.

The term "trustworthiness," as used herein, generally refers to a determination of how to classify a software program (e.g., as trusted, suspicious, malicious, etc.), where the determination is based on a reputation score, combined with the integrity of the software file, as attested by the digital signature. In addition, the term "prevalence," as used herein, generally refers to a proportion of devices and/or a number of devices on which the software file is installed (e.g., percentage of devices in which the software file is installed in a wide area network, on the Internet, on a set of randomly selected devices, on a set of trusted devices, etc.).

The systems described herein may obtain a reputation score in any of a variety of ways. For example, reputation module 108 may query database 120 to obtain reputation score 222 associated with software file 216 from software file reputations 208, which may be stored on database 120 within server 206. In one embodiment, the reputation score may be based on (1) a prevalence of the software file and/or (2) at least one detected association of the software file with malware. As described above, reputation module 108 may have obtained the prevalence of the software file by determining the percentage of devices on which the software file is installed in a wide area network or in a set of randomly selected devices. Information about detected associations of the software file with malware may have been collected in the course of conducting malware scans of client devices (e.g., and sent to a centralized database).

As described earlier, in some examples systems described herein may have identified one or more software files that were signed using a code signing certificate. In some examples, these systems may have obtained one or more software files signed by a particular code signing certificate from the software publisher. Additionally or alternatively, these systems may have obtained one or more software files signed by the code signing certificate from a reputable software distributor or retailer. In some examples, publisher identification module 106 may utilize a verified and secure communication channel to obtain software files from the software publisher and/or distributor.

Systems described herein may also obtain, for each software file identified, a reputation score that indicates a likelihood that the software publisher did not authorize the software file to be signed using the code signing certificate. As described in detail above, reputation module 108 may query database 120 to obtain a reputation score for each software file identified.

As will be described in greater detail below, systems described herein may also provide, to the software publisher, a list of software files prioritized by reputation score. Prioritizing the software files by reputation score may indicate to the software publisher which of the software files are most likely to have been signed by a compromised code signing certificate. Where the reputation score is comprised of more than one factor, reputation module 108 may prioritize the list of software files according to one or more factors most likely to reflect that a code signing certificate has been compromised.

Returning to FIG. 3, at step 308 one or more of the systems described herein may provide, to the software publisher, information based on the reputation score indicating that the code signing certificate has been compromised. For example, at step 308 reporting module 110 may, as part of computing device 202 in FIG. 2, provide, to the software publisher, information 224 based on reputation score 222 that indicates that code signing certificate 218 has been compromised.

Reporting module 110 may provide the information indicating that the code signing certificate has been compromised in any of a variety of formats. In some examples, reporting module 110 may report to the software publisher that the software file has a low reputation score due to low prevalence in a survey or inventory of devices, possibly indicating that the software file was not authorized to be signed using the code signing certificate. The software publisher may then determine that the software file is not an authorized product of the software publisher. The software file may, for example, be newly-released malware that is not yet widespread. The software file may also be non-malicious software masquerading as a software file from the software publisher that poses a potential threat to the software publisher's reputation. By identifying an unauthorized software file before the software file becomes prevalent, the software publisher may be able to take action to protect the reputation of the organization and the software publisher's authorized products.

In some examples, reporting module 110 may also report to the software publisher that the software file has a low reputation score due to detected associations with malware. The software file itself may have been identified as potential malware, or may have been identified as potentially installed by malware, as in the case of adware or spyware that is installed by a virus, Trojan horse, or a malicious or compromised website. The software publisher may determine that the software file is part of a malware threat, masquerading as an authorized product of the software publisher. The software publisher may then take action to prevent spread of the unauthorized software file, and thereby protect the software publisher's reputation.

In some examples, reporting module 110 may provide information indicating that the code signing certificate has been compromised by providing a list of software files known to have been digitally signed with the code signing certificate. Additionally, in some examples, reporting module 110 may provide prevalence and/or reputation data for one or more of the software files on the list. In some examples, reporting module 110 may structure the list to highlight software files that are more likely to be indicative of a compromised code signing certificate (e.g., by ordering the list based on the prevalence and/or reputation data of the various software files). Accordingly, a software publisher might observe that the first eight software files on the list have a low prevalence and/or low reputation scores, potentially indicating that the code signing certificate has been misused and facilitating an investigation by the software publisher into the eight suspect software files.

In some examples, reporting module 110 may send information indicating that the code signing certificate has been compromised by sending an alert about one or more particular software files with low prevalence and/or low reputation scores. Additionally or alternatively, reporting module 110 may simply send a message stating that the code signing certificate has potentially been compromised.

In one embodiment, systems described herein may receive, from the software publisher, an indication that the software publisher did not authorize the software file to be signed by the code signing certificate. For example, as part of computing device 202 in FIG. 2, receiving module 210 may receive, from the software publisher, indication 214 indicating that the software publisher did not authorize the use of code signing certificate 218 with software file 216. Indication 214 may take the form of any suitable means of communication, such as an email or a database entry made using a web-based form.

In some examples, systems described herein may perform a security action in response to receiving an indication that the publisher of the plurality of software files did not authorize the software file to be signed by the code signing certificate. For example, as part of computing device 202 in FIG. 2, security module 212 may perform a security action in response to receiving indication 214 from the software publisher that the software publisher did not authorize software file 216 to be signed by code signing certificate 218.

Security module 212 may perform any of a variety of security actions. For example, security module 212 may issue a security alert to a list of subscribers indicating that the code signing certificate has been compromised and/or that the software file is not trusted. In some examples, security module 212 may post a security alert regarding the code signing certificate and/or the software file on a publically-available web page. Additionally or alternatively, security module 212 may create an entry in a malware database, indicating that the software file is to be identified as malware by malware scanning programs.

Figure 4:
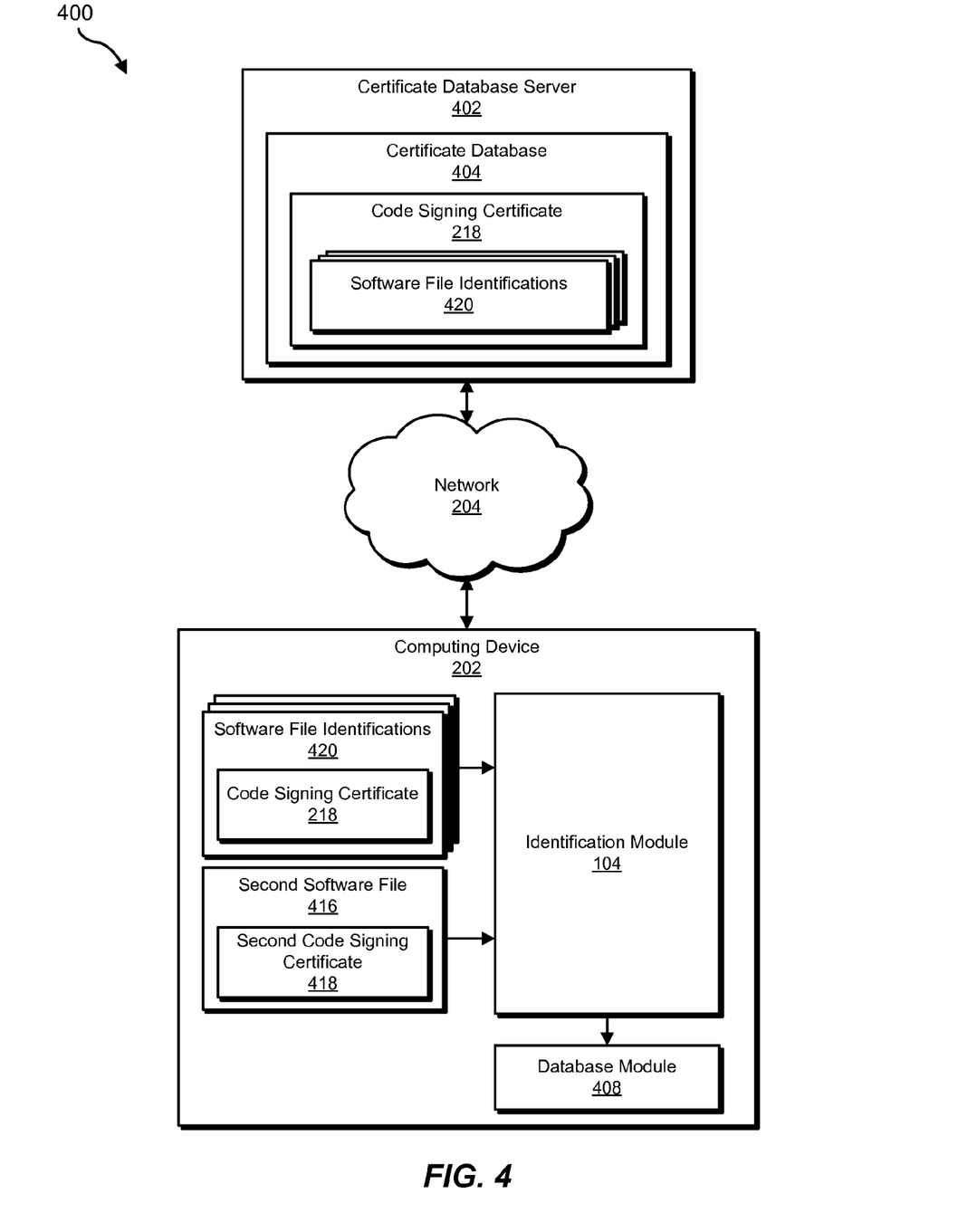
FIG. 4 is a block diagram of an exemplary system for identifying code signing certificate misuse.

The systems described herein may create and/or maintain certificate database 404 in a variety of ways. FIG. 4 is a block diagram of an exemplary system 400 capable of performing such a task. As shown in FIG. 4, exemplary system 400 may include a certificate database server 402 that may host a certificate database 404 that associates a code signing certificate 218 with one or more software file identifications 420 that were authorized to be signed using the code signing certificate 218.

In one embodiment, systems described herein may receive, from the software publisher, software file identifications for one or more software files authorized to be signed by a code signing certificate. For example, as part of computing device 202 in FIG. 4, identification module 104 may receive from the software publisher software file indications 420 that indicate that the software publisher authorized to be signed using code signing certificate 218. Identification module 104 may receive software file indications from the software publisher in any suitable manner, such as email, email attachments, files transmitted using file transfer protocol (FTP), files copied to a shared folder, and/or database entries made using a web-based form.

In one embodiment, systems described herein may compile a certificate database by associating code signing certificates with identification of one or more software files authorized to be signed using the code signing certificates. For example, as part of computing device 202 in FIG. 4, database module 408 may create certificate database 404 on certificate database server 402. Database module 408 may also create an entry in certificate database 404, associating code signing certificate 218 with one or more software file identifications 420 that the software publisher reportedly authorized to be signed using code signing certificate 218.

Database module 408 may compile the certificate database in any suitable manner. For example, database module 408 may install proprietary or commercially-available database software and create a database configured to associate code signing certificates with one or more software file identifications that were authorized by the software publisher to be signed using the code signing certificates.

In one example, systems described herein may identify additional software files and code signing certificates that database module 408 may include in the certificate database. For example, methods described herein may include (1) obtaining a second software file signed using a second code signing certificate, (2) extracting from the second software file the second code signing certificate used to sign the software file, and (3) adding to the certificate database an entry associating the extracted second code signing certificate with identification of the second software file. For example, as depicted in FIG. 4, identification module 104 may obtain second software file 416, which was authorized by the software publisher to be signed using second code signing certificate 418. Database module 408 may extract second code signing certificate 418 from second software file 416 and add to certificate database 404 an entry associating second code signing certificate 418 with second software file 416.

In one embodiment, identification of each software file in the certificate database may include (1) the software file and/or (2) a digital signature from the software file. For example, one software file may be compared to a software file in the certificate database to verify that it is identical to the file the software publisher authorized to be signed by the code signing certificate. The same determination may be made if the certificate database includes only the digital signature from the authorized software file. As will be described in greater detail below, a digital signature included in a software file may be used to verify that the software file has not been modified since it was created. Likewise, by comparing the digital signature in a software file to the digital signature of a software file known to have been authorized by the software publisher to be signed by a digital certificate, it may be determined that the software file is identical to the authorized software file.

Figure 5:
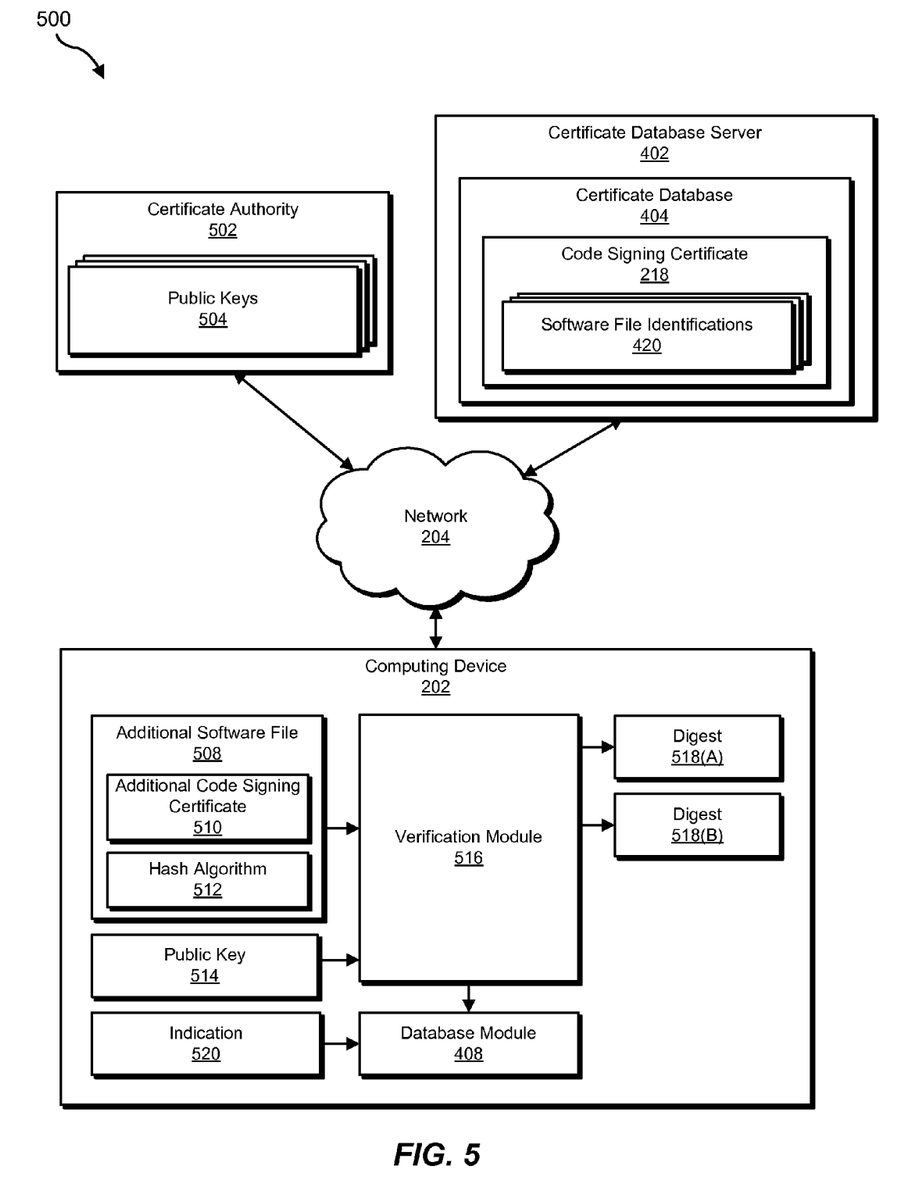
FIG. 5 is block diagram of an exemplary system for identifying code signing certificate misuse.

As an example of verifying the integrity of a software file, FIG. 5 illustrates an exemplary system 500 for identifying code signing misuse. As shown in FIG. 5, exemplary system 500 may include computing device 202, network 204, code signing certificate 218, and software file identifications 420, also depicted in FIG. 2. Exemplary system 500 may also include certificate database server 402, certificate database 404, and database module 408, which were previously depicted in FIG. 4. Exemplary system 500 may also include certificate authority 502, configured to provide, via network 204, public keys 504 corresponding to software files that were signed using code signing certificates corresponding to the public keys 504.

In some examples, systems described herein may receive a software file signed using a code signing certificate in order to verify that the software publisher associated with the code signing certificate authorized the software file to be signed by the code signing certificate. For example, as part of computing device 202 in FIG. 5, verification module 516 may receive additional software file 508, which was signed using additional code signing certificate 510, using hash algorithm 512.

Verification module 516 may receive additional software file 508 in any of a variety of ways. For example, a user may submit a suspect or unverified software file to verify that the software file was authorized by the software publisher to be signed using the code signing certificate. The software file may be submitted in any suitable manner, such as by email, transmission using file transfer protocol (FTP), or by copying the software file to a shared folder.

In some examples, systems described herein may verify the integrity of a received software file by obtaining a public key of a key pair used to encrypt a software file digest included in a digital signature of the additional software file, decrypt the software file digest included in the digital signature of the additional software file, create a second software file digest using a hash algorithm specified in the digital signature of the additional software file, and verify that the software file digest and the second software file digest are identical. For example, verification module 516 may request public key 514 from certificate authority 502, which may be identified in additional code signing certificate 510 as the public key that may be used to verify the integrity of additional software file 508. Verification module 516 may then decrypt the software file digest (e.g., digest 518(A)) included in the digital signature of additional software file 508 and create a second software file digest (e.g., digest 518(B)) using hash algorithm 512. Verification module 516 may then verify the integrity of additional software file 508 (i.e., may verify that additional software file 508 has not been modified since it was signed using additional code signing certificate 510) by confirming that software file digests 518(A) and 518(B) are identical.

In some examples, systems described herein may query the certificate database, using identification of a receive software file, to determine whether the software file was authorized by the software publisher to be signed using the code signing certificate included in the software file. For example, as part of computing device 202 in FIG. 5, database module 408 may query certificate database 404 using identification of additional software file 508.

Database module 408 may query certificate database 404 in a variety of ways. For example, certificate database 404 may be configured to receive the digital signature from a software file and verify that software publisher authorized the software file to be signed using the code signing certificate included in the digital signature. In another example, database module 408 may submit additional software file 508 to certificate database 404 for verification that the software publisher authorized use of the code signing certificate included in the software file.

In some examples, systems described herein may receive, in response to querying the certificate database, indication of whether the software publisher authorized the received software file to be signed using the code signing certificate included in the software file. For example, as part of computing device 202 in FIG. 5, database module 408 may receive indication 520 from certificate database 404 that indicates whether the software publisher authorized additional software file 508 to be signed using additional code signing certificate 510.

Database module 408 may receive indication of whether the software publisher authorized a received software file to be signed using the included code signing certificate in any suitable manner. For example, database module 408 may receive a response conforming to a standard database protocol.

As explained above, the systems and methods described herein may aid in identifying code signing certificate misuse by obtaining a reputation score that may indicate the trustworthiness of the code signing certificate independently of the code signing certificate, and notifying the software publisher that the code signing certificate may have been compromised. Analysis combining the code signing certificate with reputation data may increase the integrity of the code signing process by identifying software files that were not authorized to be digitally signed by the software publisher identified in the code signing certificate. Systems and methods described herein may function equally effectively whether a misused certificate was obtained by any means, including theft, fraud, or forgery.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying code signing certificate misuse.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for identifying code signing misuse. In some embodiments, one or more of the modules recited herein may transform prevalence and malware detection data into reputation scores. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying code signing certificate misuse, at least a portion of the method being performed by a computing device comprising at least one processor, the method comprising:
   identifying a software file that has been signed using a code signing certificate;
   identifying a software publisher that is identified by the code signing certificate used to sign the software file;
   obtaining a reputation score for the software file by querying a centralized database comprising a plurality of file reputations, wherein:
      the reputation score indicates a trustworthiness of the software file independently of the code signing certificate;
      the reputation score is based on information that is collected in the course of conducting malware scans of client devices and sent to the centralized database;
   providing, to the software publisher, information that is based on the reputation score and that indicates that the code signing certificate has been compromised.

2. The computer-implemented method of claim 1, wherein the reputation score is based on at least one of:
   a prevalence of the software file;
   at least one detected association of the software file with malware.

3. The computer-implemented method of claim 1, further comprising:
   identifying a plurality of software files that were signed using the code signing certificate;
   obtaining, for each software file in the plurality of software files, a reputation score that indicates a likelihood that the software publisher did not authorize the software file to be signed using the code signing certificate;
   providing, to the software publisher, a list of software files in the plurality of software files, prioritized by reputation score.

4. The computer-implemented method of claim 1, further comprising receiving, from the software publisher, an indication that the software publisher did not authorize the software file to be signed by the code signing certificate.

5. The computer-implemented method of claim 4, further comprising performing a security action in response to receiving the indication that the software publisher did not authorize the software file to be signed by the code signing certificate.

6. The computer-implemented method of claim 1, further comprising:
   receiving, from the software publisher, for each software file in a plurality of software files authorized to be signed using the code signing certificate, identification of the software file;
   compiling a certificate database associating the code signing certificate with identification of each software file in the plurality of software files authorized to be signed using the code signing certificate.

7. The computer-implemented method of claim 6, further comprising:
   obtaining a second software file signed using a second code signing certificate;
   extracting from the second software file the second code signing certificate used to sign the software file;
   adding to the certificate database an entry associating the extracted second code signing certificate with identification of the second software file.

8. The computer-implemented method of claim 6, wherein identification of each software file in the plurality of software files comprises identification of at least one of:
   the software file;
   a digital signature from the software file.

9. The computer-implemented method of claim 6, further comprising verifying that an additional software file was signed by an authorized certificate by:
   receiving the additional software file signed using an additional code signing certificate;
   verifying the integrity of the additional software file by:
      obtaining a public key of a key pair used to encrypt a software file digest included in a digital signature of the additional software file;
      decrypting the software file digest included in the digital signature of the additional software file;
      creating a second software file digest using a hash algorithm specified in the digital signature of the additional software file;
      verifying that the software file digest and the second software file digest are identical;
   querying, using identification of the additional software file, the certificate database;
   receiving, in response to querying the certificate database, indication of whether the software publisher authorized the additional software file to be signed using the additional code signing certificate.

10. A system for identifying code signing certificate misuse, the system comprising:
   an identification module that identifies a software file that has been signed using a code signing certificate;
   a publisher identification module that identifies a software publisher that is identified by the code signing certificate used to sign the software file;
   a reputation module that obtains a reputation score for the software file by querying a centralized database comprising a plurality of file reputations, wherein:
      the reputation score indicates a trustworthiness of the software file independently of the code signing certificate;
      the reputation score is based on information that is collected in the course of conducting malware scans of client devices and sent to the centralized database;
   a reporting module that provides, to the software publisher, information that is based on the reputation score and that indicates that the code signing certificate has been compromised;
   at least one processor configured to execute the identification module, the publisher identification module, the reputation module, and the reporting module.

11. The system of claim 10, wherein the reputation score is based on at least one of:
a prevalence of the software file;
at least one detected association of the software file with malware.

12. The system of claim 10, wherein:
the identification module identifies a plurality of software files that were signed using the code signing certificate;
the reputation module obtains, for each software file in the plurality of software files, a reputation score that indicates a likelihood that the software publisher did not authorize the software file to be signed using the code signing certificate;
the reporting module provides, to the software publisher, a list of software files in the plurality of software files, prioritized by reputation score.

13. The system of claim 10, further comprising a receiving module that receives, from the software publisher, an indication that the software publisher did not authorize the software file to be signed by the code signing certificate.

14. The system of claim 13, further comprising a security module that performs a security action in response to receiving the indication that the software publisher did not authorize the software file to be signed by the code signing certificate.

15. The system of claim 10:
wherein the identification module receives, from the software publisher, for each software file in a plurality of software files authorized to be signed using the code signing certificate, identification of the software file;
further comprising a database module that compiles a certificate database associating the code signing certificate with identification of each software file in the plurality of software files authorized to be signed using the code signing certificate.

16. The system of claim 15, wherein:
the identification module obtains a second software file signed using a second code signing certificate;
the identification module extracts from the second software file the second code signing certificate used to sign the software file;
the database module adds to the certificate database an entry associating the extracted second code signing certificate with identification of the second software file.

17. The system of claim 15, wherein identification of each software file in the plurality of software files comprises identification of at least one of:
the software file;
a digital signature from the software file.

18. The system of claim 15:
further comprising a verification module that verifies that an additional software file was signed by an authorized certificate by:
receiving the additional software file signed using an additional code signing certificate;
verifying the integrity of the additional software file by:
obtaining a public key of a key pair used to encrypt a software file digest included in a digital signature of the additional software file;
decrypting the software file digest included in the digital signature of the additional software file;
creating a second software file digest using a hash algorithm specified in the digital signature of the additional software file;
verifying that the software file digest and the second software file digest are identical;
wherein the database module:
queries, using identification of the software file, the certificate database;
receives, in response to querying the certificate database, indication of whether the software publisher authorized the file to be signed using the code signing certificate.

19. A non-transitory computer-readable medium comprising one or more computer-executable instructions that, when executed by at least one processor of a computing device, cause the computing device to:
identify a software file that has been signed using a code signing certificate;
identify a software publisher that is identified by the code signing certificate used to sign the software file;
obtain a reputation score for the software file by querying a centralized database comprising a plurality of file reputations, wherein:
the reputation score indicates a trustworthiness of the software file independently of the code signing certificate;
the reputation score is based on information that is collected in the course of conducting malware scans of client devices and sent to the centralized database;
provide, to the software publisher, information that is based on the reputation score and that indicates that the code signing certificate has been compromised.

20. The non-transitory computer-readable medium of claim 19, wherein the one or more computer-readable instructions cause the computing device to:
identify a plurality of software files that were signed using the code signing certificate;
obtain, for each software file in the plurality of software files, a reputation score that indicates a likelihood that the software publisher did not authorize the software file to be signed using the code signing certificate;
provide, to the software publisher, a list of software files in the plurality of software files, prioritized by reputation score.

* * * * *